US012558939B2

(12) United States Patent
Yahia et al.

(10) Patent No.: US 12,558,939 B2
(45) Date of Patent: Feb. 24, 2026

(54) THERMAL CONDITIONING SYSTEM

(71) Applicant: VALEO SYSTEMES THERMIQUES,
La Verriere (FR)

(72) Inventors: Mohamed Yahia, La Verriere (FR);
Bertrand Nicolas, La Verriere (FR);
Stefan Karl, La Verriere (FR)

(73) Assignee: Valeo Systemes Thermiques,
LaVerriere (FR)

( * ) Notice: Subject to any disclaimer, the term of this
patent is extended or adjusted under 35
U.S.C. 154(b) by 221 days.

(21) Appl. No.: 18/550,767

(22) PCT Filed: Mar. 15, 2022

(86) PCT No.: PCT/EP2022/056593
§ 371 (c)(1),
(2) Date: Sep. 15, 2023

(87) PCT Pub. No.: WO2022/194806
PCT Pub. Date: Sep. 22, 2022

(65) Prior Publication Data
US 2024/0100909 A1      Mar. 28, 2024

(30) Foreign Application Priority Data
Mar. 15, 2021      (FR) ...................................... 2102565

(51) Int. Cl.
B60H 1/00              (2006.01)

(52) U.S. Cl.
CPC ..... B60H 1/00885 (2013.01); B60H 1/00278
(2013.01); B60H 1/00921 (2013.01)

(58) Field of Classification Search
CPC ............ B60H 1/00885; B60H 1/00278; B60H
1/00921; B60H 1/323; B60H 1/32284;
(Continued)

(56) References Cited

U.S. PATENT DOCUMENTS 5,782,102 A * 7/1998 Iritani ..................... F25B 39/04
62/197
11,292,313 B2    4/2022 Kim
(Continued)

FOREIGN PATENT DOCUMENTS

CN        209274301 U      8/2019
EP        2933586 B1     10/2015
(Continued)

OTHER PUBLICATIONS

European Patent Office, International Search Report (with English
translation) and Written Opinion of corresponding International
Application No. PCT/EP2022/056593, dated Jun. 15, 2022.

*Primary Examiner* — Marc E Norman
(74) *Attorney, Agent, or Firm* — Valeo Systemes
Thermiques

(57)              ABSTRACT

Thermal conditioning system including a refrigerant circuit
successively including: a compression device; a first two-
fluid heat exchanger arranged on a first loop of a heat
transfer liquid circuit; a second two-fluid heat exchanger
arranged on a second heat transfer liquid loop; a first
expansion device; a third two-fluid heat exchanger arranged
on a third heat transfer liquid loop. The first loop has a first
heat exchanger configured to exchange heat with a first air
flow. The second loop has a second heat exchanger config-
ured to exchange heat with a second air flow. The third loop
has a third heat exchanger configured to exchange heat with
the first air flow. The first loop includes a fourth heat
exchanger configured to exchange heat with the second air
flow.

12 Claims, 5 Drawing Sheets

(58) Field of Classification Search
CPC ........... B60H 2001/00949; B60H 2001/00307;
F25B 25/005; F25B 5/02; F25B 6/04
See application file for complete search history.

(56) References Cited

U.S. PATENT DOCUMENTS

| | | | |
|---|---|---|---|
| 11,370,271 B2 | 6/2022 | Durrani et al. | |
| 2017/0197490 A1* | 7/2017 | Enomoto | ........... B60H 1/00485 |
| 2017/0253105 A1* | 9/2017 | Allgaeuer | .............. B60H 1/143 |
| 2022/0128273 A1* | 4/2022 | Benouali | ........... B60H 1/00921 |
| 2023/0339293 A1* | 10/2023 | Durrani | ............. B60H 1/32284 |
| 2024/0181847 A1* | 6/2024 | Yahia | .................... B60H 1/323 |

FOREIGN PATENT DOCUMENTS

| | | | |
|---|---|---|---|
| FR | 2936445 A1 | 4/2010 |
| FR | 3071911 A1 | 4/2019 |
| FR | 3100491 A1 | 3/2021 |
| WO | 2020045261 A1 | 3/2020 |

* cited by examiner

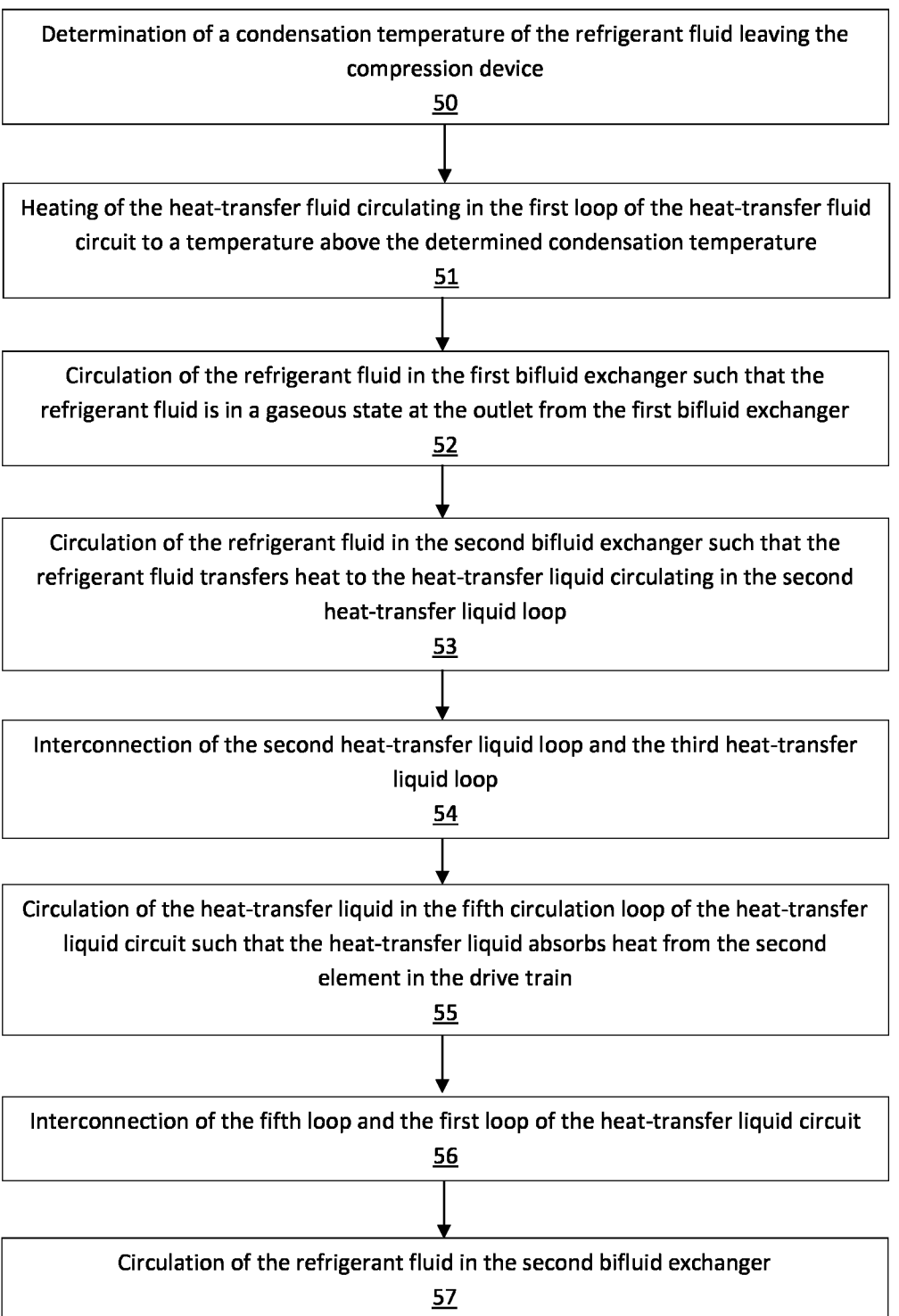

Determination of a condensation temperature of the refrigerant fluid leaving the compression device
50

Heating of the heat-transfer fluid circulating in the first loop of the heat-transfer fluid circuit to a temperature above the determined condensation temperature
51

Circulation of the refrigerant fluid in the first bifluid exchanger such that the refrigerant fluid is in a gaseous state at the outlet from the first bifluid exchanger
52

Circulation of the refrigerant fluid in the second bifluid exchanger such that the refrigerant fluid transfers heat to the heat-transfer liquid circulating in the second heat-transfer liquid loop
53

Interconnection of the second heat-transfer liquid loop and the third heat-transfer liquid loop
54

Circulation of the heat-transfer liquid in the fifth circulation loop of the heat-transfer liquid circuit such that the heat-transfer liquid absorbs heat from the second element in the drive train
55

Interconnection of the fifth loop and the first loop of the heat-transfer liquid circuit
56

Circulation of the refrigerant fluid in the second bifluid exchanger
57

Fig. 5

THERMAL CONDITIONING SYSTEM

TECHNICAL FIELD

The present invention concerns the field of thermal conditioning systems. A possible application for such systems is to provide thermal conditioning of a motor vehicle. Thermal regulation of various elements of the vehicle can thus be ensured. These various elements can for example be the vehicle passenger compartment, or an electrical energy storage battery in the case of a vehicle with electrical propulsion. The heat exchanges are mainly managed by compression and expansion of a refrigerant fluid which can circulate in several heat exchangers.

BACKGROUND OF THE INVENTION

Current thermal conditioning systems use a loop for refrigerant fluid and a loop for heat-transfer fluid which exchanges heat with the refrigerant fluid. Such systems are thus referred to as indirect. Patent EP2933586 B1 is one example. The refrigerant fluid loop is formed such that the refrigerant fluid transfers heat to the liquid heat-transfer fluid in a bifluid exchanger, then passes through a heat exchanger arranged in the passenger compartment, also called an evaporator. This exchanger allows cooling of the passenger compartment. The passenger compartment is heated in particular by a heating radiator which dissipates the heat from the heat-transfer fluid into the air flow directed to the passenger compartment.

The various heat exchangers are conventionally distributed over various locations in the vehicle. Some exchangers are arranged in the passenger compartment of the vehicle. Other exchangers are arranged under the bonnet, close to the front end of the vehicle. The various components can be connected by pipes allowing circulation of the refrigerant fluid and the heat-transfer fluid. Integration of all these components can be difficult because of the space required. Also, the presence of components containing refrigerant fluid in the passenger compartment can be prohibited. This is the case for example when the refrigerant fluid used can be toxic to occupants in the case of leaks, or when the refrigerant fluid is flammable.

There is therefore a need to provide thermal conditioning systems which are easier to integrate, in which any type of refrigerant fluid can be used, and which offer better thermodynamic performance.

BRIEF SUMMARY OF THE INVENTION

To this end, the present invention proposes a thermal conditioning system, comprising:

a heat-transfer liquid circuit, —a refrigerant fluid circuit comprising a main refrigerant fluid circulation loop containing successively, in a circulation direction of the refrigerant fluid:

a compression device, a first bifluid exchanger arranged both on the refrigerant fluid circuit and on a first loop of the heat-transfer liquid circuit so as to allow an exchange of heat between the refrigerant fluid and the heat-transfer liquid of the first loop, a second bifluid exchanger arranged both on the refrigerant fluid circuit and on a second loop of the heat-transfer liquid circuit so as to allow an exchange of heat between the refrigerant fluid and the heat-transfer liquid of the second loop, a first expansion device, a third bifluid exchanger arranged both on the refrigerant fluid circuit and on a third loop of the heat-transfer liquid circuit so as to allow an exchange of heat between the refrigerant fluid and the heat-transfer liquid of the third loop, wherein the first heat-transfer liquid loop comprises a first heat exchanger configured to exchange heat with a first air flow, wherein the second heat-transfer liquid loop comprises a second heat exchanger configured to exchange heat with a second air flow, wherein the third heat-transfer liquid loop comprises a third heat exchanger configured to exchange heat with the first air flow, and wherein the first heat-transfer liquid loop comprises a fourth heat exchanger configured to exchange heat with the second air flow.

The first air flow can be thermally conditioned by the first exchanger and the third exchanger, in which heat-transfer liquid circulates. The first air flow therefore does not risk containing refrigerant fluid even in the case of leakage in the circuit. Furthermore, the proposed structure for the thermal conditioning system with two bifluid exchangers in series in the direction of circulation of the refrigerant fluid, wherein each bifluid exchanger is coupled to an exchanger which can absorb or dissipate heat in the second air flow, allows multiple operating modes for optimization of performance as a function of operating conditions. Furthermore, the proposed structure is particularly simple for the circulation lines of the refrigerant fluid, which allows a particularly compact refrigerant fluid circuit using a small quantity of refrigerant fluid.

The characteristics listed in the following paragraphs can be used independently of one another or in any technically possible combination:

According to an exemplary embodiment, the thermal conditioning system is a thermal conditioning system fora motor vehicle.

The first loop of the heat-transfer liquid circuit comprises a main loop and an auxiliary loop.

The second heat exchanger is arranged upstream of the fourth heat exchanger in a flow direction of the second air flow.

The third heat exchanger is arranged upstream of the first heat exchanger in a flow direction of the first air flow.

The first air flow is an air flow inside a passenger compartment of a motor vehicle.

The second air flow is an air flow outside a passenger compartment of a motor vehicle.

The refrigerant fluid circuit comprises a first bypass branch connecting a first connection point arranged on the main loop downstream of the second bifluid exchanger and upstream of the third bifluid exchanger, to a second connection point arranged on the main loop downstream of the third bifluid exchanger and upstream of the compression device, the first bypass branch comprising a fourth bifluid exchanger configured to exchange heat with a fourth heat-transfer liquid loop.

The first expansion device is arranged on the main loop of the refrigerant fluid downstream of the first connection point and upstream of the third bifluid exchanger.

The first bypass branch comprises a second expansion device arranged upstream of the fourth bifluid exchanger.

The fourth bifluid exchanger is configured to be thermally coupled to a first element of an electric drive train of the vehicle.

The first element of the electric drive train of the vehicle is configured to exchange heat with the heat-transfer liquid circulating in the fourth heat-transfer liquid loop.

The first element of the electric drive train of the vehicle is an electrical energy storage battery.

According to an embodiment, the refrigerant fluid circuit comprises a second bypass branch connecting a third connection point arranged on the first bypass branch upstream of the fourth bifluid exchanger, to a fourth connection point arranged on the first bypass branch downstream of the fourth bifluid exchanger and upstream of the second connection point, the second bypass branch comprising a fifth bifluid exchanger configured to exchange heat with a fifth heat-transfer liquid loop.

According to an embodiment of the thermal conditioning system, the refrigerant fluid circuit comprises a second bypass branch connecting a third connection point arranged on the main loop downstream of the second bifluid exchanger and upstream of the third bifluid exchanger, to a fourth connection point arranged on the main loop downstream of the third bifluid exchanger and upstream of the compression device, the second bypass branch comprising a fifth bifluid exchanger configured to exchange heat with a fifth heat-transfer liquid loop.

The second bypass branch comprises a third expansion device arranged upstream of the fifth bifluid exchanger.

As a variant, the main loop comprises an expansion device arranged upstream of the first connection point and a shut-off valve arranged between the first connection point and the third bifluid exchanger, the first bypass branch comprises a shut-off valve arranged upstream of the fourth bifluid exchanger, and the second bypass branch comprises a shut-off valve arranged upstream of the fifth bifluid exchanger.

The fifth bifluid exchanger is configured to be thermally coupled to a second element of an electric drive train of the vehicle.

The second element of the electric drive train of the vehicle is configured to exchange heat with the heat-transfer liquid circulating in the fifth heat-transfer liquid loop.

The second element of the electric drive train of the vehicle is an electric propulsion motor of the vehicle.

The second element of the electric drive train of the vehicle is an electronic module for controlling an electric propulsion motor of the vehicle.

According to an aspect of the invention, the first heat-transfer liquid loop comprises:

a main loop comprising the first bifluid exchanger and the first heat exchanger, —a bypass branch connecting a first connection point arranged upstream of the first bifluid exchanger to a second connection point arranged downstream of the first bifluid exchanger, the fourth heat exchanger being arranged on the bypass branch.

The third heat-transfer liquid loop and the second heat-transfer liquid loop are configured to be fluidically connected.

The heat-transfer liquid circuit comprises a first connection branch connecting a third connection point arranged on the second heat-transfer liquid loop between the second heat exchanger and the second bifluid exchanger, to a fourth connection point arranged on the third heat-transfer liquid loop between the third heat exchanger and the third bifluid exchanger.

The heat-transfer liquid circuit comprises a second connection branch connecting a fifth connection point arranged on the third heat-transfer liquid loop between the third bifluid exchanger and the third heat exchanger, to a sixth connection point arranged on the second heat-transfer liquid loop between the second bifluid exchanger and the second heat exchanger.

The fourth heat-transfer liquid loop and the second heat-transfer liquid loop are configured to be fluidically connected.

The heat-transfer liquid circuit comprises a third connection branch connecting a seventh connection point arranged on the second heat-transfer liquid loop between the second heat exchanger and the third connection point, to an eighth connection point arranged on the fourth heat-transfer liquid loop between the fourth bifluid exchanger and the first element.

The heat-transfer liquid circuit comprises a fourth connection branch connecting a ninth connection point arranged on the fourth heat-transfer liquid loop between the first element of the drive train and the fourth bifluid exchanger, to a tenth connection point arranged on the second heat-transfer liquid loop between the sixth connection point and the second heat exchanger.

The fifth heat-transfer liquid loop and the first heat-transfer liquid loop are configured to be fluidically connected.

The heat-transfer liquid circuit comprises a fifth connection branch connecting an eleventh connection point arranged on the fifth heat-transfer liquid loop upstream of the second element of the drive train and downstream of the fifth bifluid exchanger, to a twelfth connection point arranged on the first heat-transfer liquid loop downstream of the first connection point and upstream of the fourth heat exchanger.

The heat-transfer liquid circuit comprises a sixth connection branch connecting a thirteenth connection point arranged on the fifth heat-transfer liquid loop downstream of the fifth bifluid exchanger and upstream of the second element of the drive train, to a fourteenth connection point arranged on the first heat-transfer liquid loop downstream of the fourth heat exchanger and upstream of the second connection point.

The first heat-transfer liquid loop is configured to be separate from the second heat-transfer liquid loop.

The first heat-transfer liquid loop comprises a first heat-transfer liquid circulation pump.

The first heat-transfer liquid circulation pump is arranged in a portion common to the main loop and the auxiliary loop.

The second heat-transfer liquid loop comprises a second heat-transfer liquid circulation pump.

The second heat-transfer liquid circulation pump is arranged on the second heat-transfer liquid loop between the seventh connection point and the third connection point.

The third heat-transfer liquid loop comprises a third heat-transfer liquid circulation pump.

The third heat-transfer liquid circulation pump is arranged on the third heat-transfer liquid loop between the third heat exchanger and the fourth connection point.

The fourth heat-transfer liquid loop comprises a fourth heat-transfer liquid circulation pump.

The fourth heat-transfer liquid circulation pump is arranged on the fourth heat-transfer liquid loop between the eighth connection point and the first element of the drive train.

The fifth heat-transfer liquid loop comprises a fifth heat-transfer liquid circulation pump.

The fifth heat-transfer liquid circulation pump is arranged on the fifth heat-transfer liquid loop between the eleventh connection point and the second element of the drive train.

The first heat-transfer liquid circulation loop comprises a first three-way valve arranged both on the main loop and on the bypass branch.

The second heat-transfer liquid circulation loop comprises a second three-way valve also arranged on the first connection branch.

The fifth heat-transfer liquid circulation loop comprises a third three-way valve arranged both on the fifth circulation loop and on the sixth connection branch.

The second heat-transfer liquid circulation loop comprises a first shut-off valve.

The first shut-off valve is arranged between the second heat exchanger and the seventh connection point.

The third connection branch comprises a second shut-off valve.

The main refrigerant fluid loop comprises a refrigerant fluid collection device arranged downstream of the second connection point and upstream of the compression device.

The main loop comprises an internal heat exchanger, the internal heat exchanger comprising a first heat-exchange portion arranged downstream of the second bifluid exchanger and upstream of the first connection point, and a second heat-exchange portion arranged downstream of the collection device and upstream of the compression device, the internal heat exchanger being configured to allow an exchange of heat between the refrigerant fluid in the first heat-exchange portion and the refrigerant fluid in the second heat-exchange portion.

The thermal conditioning system comprises a device configured to vary a passage cross-section of the second air flow to the second heat exchanger.

The invention also concerns a method for operation of a thermal conditioning system as described above in a so-called decoupled heating mode, the method comprising the steps:

determination of a condensation temperature of the refrigerant fluid leaving the compression device, heating of the heat-transfer fluid circulating in the first loop of the heat-transfer fluid circuit to a temperature above the determined condensation temperature, circulation of the refrigerant fluid in the first bifluid exchanger such that the refrigerant fluid is in a gaseous state at the outlet from the first bifluid exchanger, circulation of the refrigerant fluid in the second bifluid exchanger such that the refrigerant fluid transfers heat to the heat-transfer liquid circulating in the second heat-transfer liquid loop, interconnection of the second heat-transfer liquid loop and the third heat-transfer liquid loop, such that the third heat exchanger transfers heat to the first air flow.

The first circulation loop of the heat-transfer liquid circuit comprises an electrical heating device configured for heating the heat-transfer fluid, the method comprising the step:

controlling the electrical heating device so as to heat the heat-transfer fluid to a temperature above the determined condensation temperature.

The electrical heating device is arranged on the main loop of the first heat-transfer liquid circulation loop.

The invention also concerns a method for operation of a thermal conditioning system as described above in a so-called decoupled cooling mode, the method comprising the steps:

determination of a condensation temperature of the refrigerant fluid leaving the compression device, circulation of the heat-transfer liquid in the fifth circulation loop of the heat-transfer liquid circuit such that the heat-transfer liquid absorbs heat from the second element in the drive train, interconnection of the fifth loop and the first loop of the heat-transfer liquid circuit, circulation of the refrigerant fluid in the first bifluid exchanger, so as to heat the refrigerant fluid to a temperature above the determined condensation temperature, such that the refrigerant fluid is in a gaseous state at the outlet from the first bifluid exchanger, circulation of the refrigerant fluid in the second bifluid exchanger, expansion of the refrigerant fluid in the first expansion device so as to lower its pressure, circulation of the low-pressure refrigerant fluid in the third bifluid exchanger so as to cool the heat-transfer liquid circulating in the third heat-transfer liquid circulation loop, circulation of the heat-transfer liquid in the third heat-transfer liquid circulation loop such that the third heat exchanger absorbs heat from the first air flow.

The fifth heat-transfer liquid circulation loop and the first heat-transfer liquid circulation are interconnected when the temperature of the heat-transfer liquid circulating in the fifth loop is above a predefined threshold.

The invention also concerns a method for operation of a thermal conditioning system as described above in a so-called standard dehumidification and auxiliary heating mode, in which:

the refrigerant fluid circulates in the compression device where its pressure rises, and circulates successively in the first bifluid exchanger, in the second bifluid exchanger where it transfers heat to the heat-transfer liquid in the second loop, in the first expansion device where its pressure falls, in the third bifluid exchanger where it absorbs heat, the low-pressure refrigerant fluid returning to the compression device, —the heat-transfer liquid of the second loop circulates successively in the second bifluid exchanger where it receives heat from the refrigerant fluid, in the fourth connection branch, in the first element where it transfers heat to the first element.

The invention also applies to a method for operation of a thermal conditioning system as described above in a so-called recuperation and auxiliary heating mode, in which:

the refrigerant fluid circulates in the compression device where its pressure rises, and circulates successively in the first bifluid exchanger, in the second bifluid exchanger where it transfers heat to the heat-transfer liquid in the second loop, in the third expansion device where its pressure falls, in the fifth bifluid exchanger where it absorbs heat, the low-pressure refrigerant fluid returning to the compression device, the heat-transfer liquid of the second loop circulates successively in the second bifluid exchanger where it receives heat from the refrigerant fluid, in the fourth connection branch, in the first element where it transfers heat to the first element, the heat-transfer liquid of the fifth loop circulates successively in the second element where it absorbs heat, and in the fifth bifluid exchanger where it transfers heat to the refrigerant fluid.

In both preceding modes in which heating of the first element is provided, the flow of heat-transfer fluid in the first loop can be zero. Thus the quantity of heat transferred to the first element is maximized. In effect, the thermal exchange with the heat-transfer liquid of the first loop is thus minimized.

Alternatively or additionally, the flow of the first air flow is zero.

BRIEF DESCRIPTION OF THE DRAWINGS

Further features, details and advantages will become apparent on reading the detailed description below, and on studying the attached drawings, in which:

FIG. 5 is a block diagram of an operating method of a thermal conditioning system according to the invention.

DETAILED DESCRIPTION OF THE INVENTION

Figure 1:
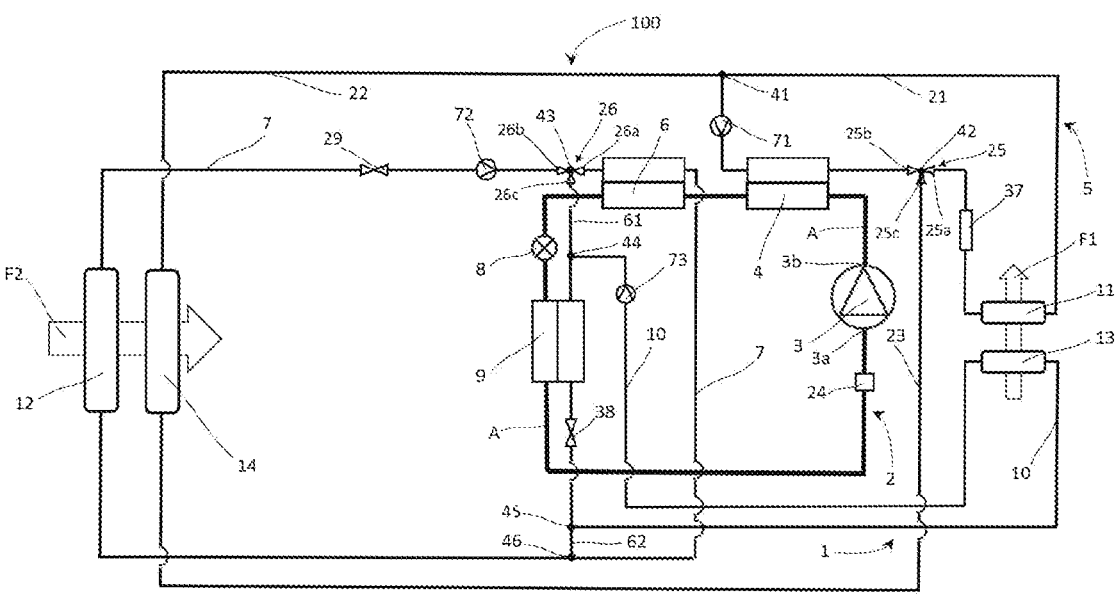
FIG. 1 is a schematic view of a thermal conditioning system according to a first embodiment of the invention.

To facilitate reading of the figures, the various elements are not necessarily shown to scale. In these figures, identical elements have the same reference signs. Some elements or parameters can be indexed, in other words designated for example first element or second element, or first parameter and second parameter, etc. The purpose of this indexing is to differentiate between elements or parameters that are similar but not identical. This indexing does not imply a priority of an element or parameter relative to another, and the designations can be interchanged.

In the following description, the term "a first element upstream of a second element" means that the first element is placed before the second element in relation to the direction of circulation, or travel, of a fluid. Similarly, the term "a first element downstream of a second element" means that the first element is placed after the second element in relation to the direction of circulation, or travel, of the fluid concerned. In the case of the refrigerant fluid circuit, the term "a first element upstream of a second element" means that the refrigerant fluid passes successively through the first element and then the second element, without passing via the compression device. In other words, the refrigerant fluid leaves the compression device, passes through one or more elements and then passes through the first element, then the second element, then returns to the compression device, in some cases having passed through further elements.

When it is specified that a sub-system comprises a given element, this does not rule out the presence of other elements in this sub-system.

An interior air flow is an air flow intended for the passenger compartment of the motor vehicle. This interior air flow can circulate in an HVAC installation (Heating, Ventilating and Air Conditioning). This installation is not shown on the various figures.

An exterior air flow is an air flow which is not intended for the passenger compartment of the motor vehicle. In other words, this air flow remains outside the vehicle. A motorized fan assembly (not shown) can be activated in order to increase the flow of the exterior air flow if necessary. Similarly, another motorized fan assembly (also not shown) is arranged in the heating system in order to increase the flow of the interior air flow if necessary.

An electronic control unit (not shown) receives information from various sensors measuring in particular the characteristics of the refrigerant fluid at various points on the circuit. The electronic unit also receives the setpoints requested by the vehicle occupants, such as for example the temperature desired inside the passenger compartment. The electronic unit implements control laws allowing management of various actuators so as to control the thermal conditioning system 100.

Each of the expansion devices used can be an electronic expansion unit, a thermostatic expansion unit, or a calibrated orifice. In the case of an electronic expansion unit, the passage section allowing passage of the refrigerant fluid can be adjusted continuously between a closed position and a maximal opening position. For this, the control unit of the system manages an electric motor which moves a mobile shutter controlling the passage section available to the refrigerant fluid.

The compression device 3 can be an electric compressor, that is a compressor with moving parts driven by an electric motor. The compression device 3 comprises an intake side for the low-pressure refrigerant fluid, known as the inlet 3a of the compression device, and a return side for the high-pressure refrigerant fluid, also known as the outlet 3b of the compression device 3. The movable internal parts of the compressor 3 transfer the refrigerant fluid from an inlet on the low-pressure side to an outlet on the high-pressure side. After expansion in one or more expansion units, the refrigerant fluid returns to the inlet 3a of the compressor 3 and begins a new thermodynamic cycle.

Each connection point allows refrigerant fluid to pass into one or the other of the circuit portions meeting at this connection point. The distribution of the refrigerant fluid between the circuit portions meeting at a connection point is achieved by acting on the opening or closure of the shut-off valves or expansion devices contained in each of the branches. In other words, each connection point is a means of redirecting the refrigerant fluid arriving at this connection point.

The various valves and expansion devices thus allow selective conduction of the refrigerant fluid into the various branches of the refrigerant circuit so as to achieve different operating modes, as will be described below. For example, the third expansion device 18 is configured to selectively allow or prevent the passage of refrigerant fluid into the second bypass branch C.

The refrigerant fluid used by the refrigerant fluid circuit 1 is in this case a chemical fluid such as R1234yf. Other refrigerant fluids can be used, such as for example R134a or R290. The heat-transfer liquid used is for example a mixture of water and glycol.

FIG. 1 shows a thermal conditioning system according to a first embodiment. The thermal conditioning system 100 comprises:

a heat-transfer liquid circuit 1, a refrigerant fluid circuit 2 comprising a main refrigerant fluid circulation loop A containing successively, in a circulation direction of the refrigerant fluid:

a compression device 3, a first bifluid exchanger 4 arranged both on the refrigerant fluid circuit 2 and on a first loop 5 of the heat-transfer liquid circuit 1 so as to allow an exchange of heat between the refrigerant fluid and the heat-transfer liquid of the first loop 5, a second bifluid exchanger 6 arranged both on the refrigerant fluid circuit 2 and on a second loop 7 of the heat-transfer liquid circuit 1 so as to allow an exchange of heat between the refrigerant fluid and the heat-transfer liquid of the second loop 7, a first expansion device 8, a third bifluid exchanger 9 arranged both on the refrigerant fluid circuit 2 and on a third loop 10 of the heat-transfer liquid circuit 1 so as to allow an exchange of heat between the refrigerant fluid and the heat-transfer liquid of the third loop 10, wherein the first heat-transfer liquid loop 5 comprises a first heat exchanger 11 configured to exchange heat with a first air flow F1, wherein the second heat-transfer liquid loop 7 comprises a second heat exchanger 12 configured to exchange heat with a second air flow F2, wherein the third heat-transfer liquid loop 10 comprises a third heat exchanger 13 configured to exchange heat with the first air flow F1, and wherein the first heat-transfer liquid loop 5 comprises a fourth heat exchanger 14 configured to exchange heat with the second air flow F2.

The first air flow F1 can be thermally conditioned by means of the first exchanger 11 and third exchanger 13 in which heat-transfer liquid circulates. When the thermal conditioning system 100 is fitted to a vehicle, the passenger compartment of the vehicle can thus be thermally conditioned without having an exchanger containing refrigerant fluid inside the passenger compartment. Furthermore, the structure proposed for the thermal conditioning system with two bifluid exchangers 4, 6 in series in the direction of circulation of the refrigerant fluid, with each bifluid exchanger 4, 6 coupled to a respective exchanger 14, 12 able to absorb or dissipate heat in the second air flow F2, allows multiple operating modes allowing optimization of thermodynamic performance as a function of operating conditions. Furthermore, the proposed structure is particularly simple for the circulation lines of the refrigerant fluid circuit 2, which allows a refrigerant fluid circuit 2 which is particularly compact and thus uses a small quantity of refrigerant fluid.

In the exemplary embodiment illustrated here, the thermal conditioning system 100 is a thermal conditioning system for a motor vehicle.

Each loop 5, 7, 10 of the heat-transfer liquid circuit 1 is able to form a closed circuit for circulation of heat-transfer fluid. Depending on the configuration of the various valves of the heat-transfer liquid circuit 1, certain loops can be isolated from one another or can be interconnected.

The first loop 5 of the heat-transfer liquid circuit 1 comprises a main loop 21 and an auxiliary loop 22. The main loop 21 defines a closed circuit for circulation of heat-transfer liquid. Similarly, the auxiliary loop 22 defines a closed circuit for circulation of heat-transfer liquid, which is partly separate from that of the main loop 21. A portion of the main loop 21 is shared with the auxiliary loop 22. Another portion of the main loop 21 is separate from the auxiliary loop 22. The heat-transfer liquid can thus circulate either solely in the main loop 21, or solely in the auxiliary loop 22, or in both the main loop 21 and in the auxiliary loop 22.

The first loop 5 of the heat-transfer liquid circuit 1 is configured for circulation of a flow of heat-transfer liquid in a fourth heat exchanger 14 configured to exchange heat with the second air flow F2.

The second heat exchanger 12 is arranged upstream of the fourth heat exchanger 14 in a flow direction of the second air flow F2. The third heat exchanger 13 is arranged upstream of the first heat exchanger 11 in a flow direction of the first air flow F1.

The first air flow F1 is here an air flow inside a passenger compartment of a motor vehicle. The second air flow F2 is an air flow outside a passenger compartment of the vehicle.

Figure 2:
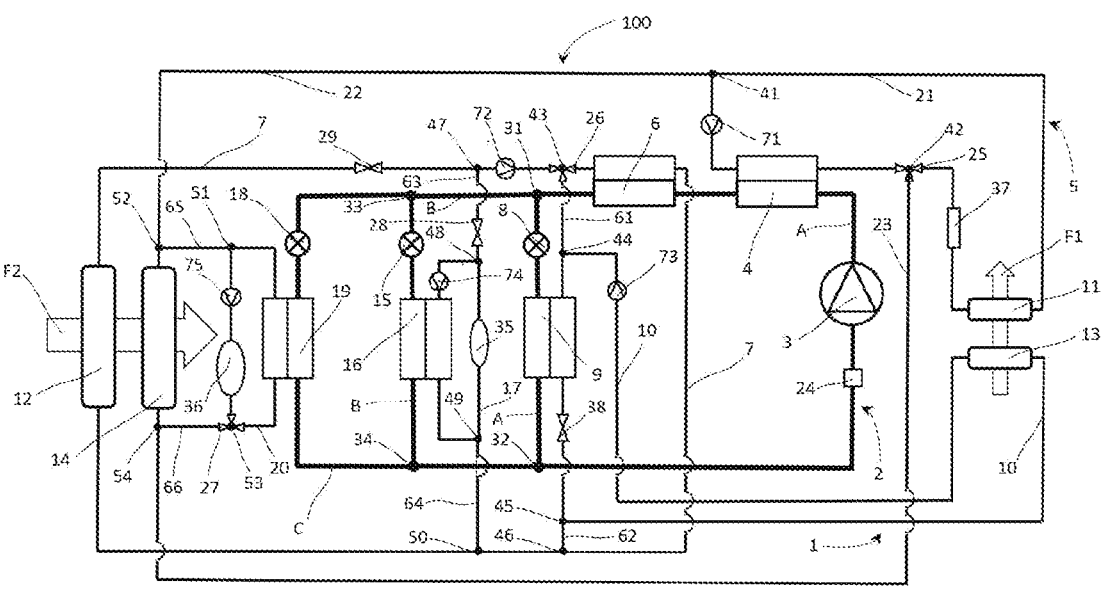
FIG. 2 is a schematic view of a thermal conditioning system according to a second embodiment of the invention.

FIG. 2 illustrates schematically a second embodiment of the thermal conditioning system 100. The refrigerant fluid circuit 2 comprises a first bypass branch B connecting a first connection point 31 arranged on the main loop A downstream of the second bifluid exchanger 6 and upstream of the third bifluid exchanger 9, to a second connection point 32 arranged on the main loop A downstream of the third bifluid exchanger 9 and upstream of the compression device 3, the first bypass branch B comprising a fourth bifluid exchanger 16 configured to exchange heat with a fourth heat-transfer liquid loop 17. In other words, the first bypass branch B is arranged in parallel with the assembly formed by the first expansion device 8 and the third bifluid exchanger 9.

The first expansion device 8 is arranged on the main refrigerant fluid loop A downstream of the first connection point 31 and upstream of the third bifluid exchanger 9. The first bypass branch B comprises a second expansion device 15 arranged upstream of the fourth bifluid exchanger 16. The fourth bifluid exchanger 16 is configured to be thermally coupled to a first element 35 of an electric drive train of the vehicle.

The first element 35 of the electric drive train of the vehicle is configured to exchange heat with the heat-transfer liquid circulating in the fourth heat-transfer liquid loop 17. The first element 35 of the electric drive train of the vehicle is an electrical energy storage battery. The loop 17 of the heat-transfer liquid circuit 1 is able to form a closed circuit for circulation of heat-transfer fluid.

According to this second embodiment, the refrigerant fluid circuit comprises a second bypass branch C connecting a third connection point 33 arranged on the first bypass branch B upstream of the fourth bifluid exchanger 16, to a fourth connection point 34 arranged on the first bypass branch B downstream of the fourth bifluid exchanger 16 and upstream of the second connection point 32, the second bypass branch C comprising a fifth bifluid exchanger 19 configured to exchange heat with a fifth heat-transfer liquid loop 20.

In other words, the second bypass branch C is connected to the first bypass branch B. The second bypass branch C and the first bypass branch B can thus be arranged in parallel with one another. Thus, in an embodiment not shown, the refrigerant fluid circuit comprises a second bypass branch C connecting a third connection point 33 arranged on the main loop downstream of the second bifluid exchanger 6 and upstream of the third bifluid exchanger 9, to a fourth connection point 34 arranged on the main loop A downstream of the third bifluid exchanger 9 and upstream of the compression device 3, the second bypass branch C comprising a fifth bifluid exchanger 19 configured to exchange heat with a fifth heat-transfer liquid loop 20.

The second bypass branch C comprises a third expansion device 18 arranged upstream of the fifth bifluid exchanger 19. In other words, in the second embodiment illustrated on FIG. 2, the main loop A and the bypass branches B, C each contain a dedicated expansion device, respectively designated by signs 8, 15, 18.

Figures 3, 4:
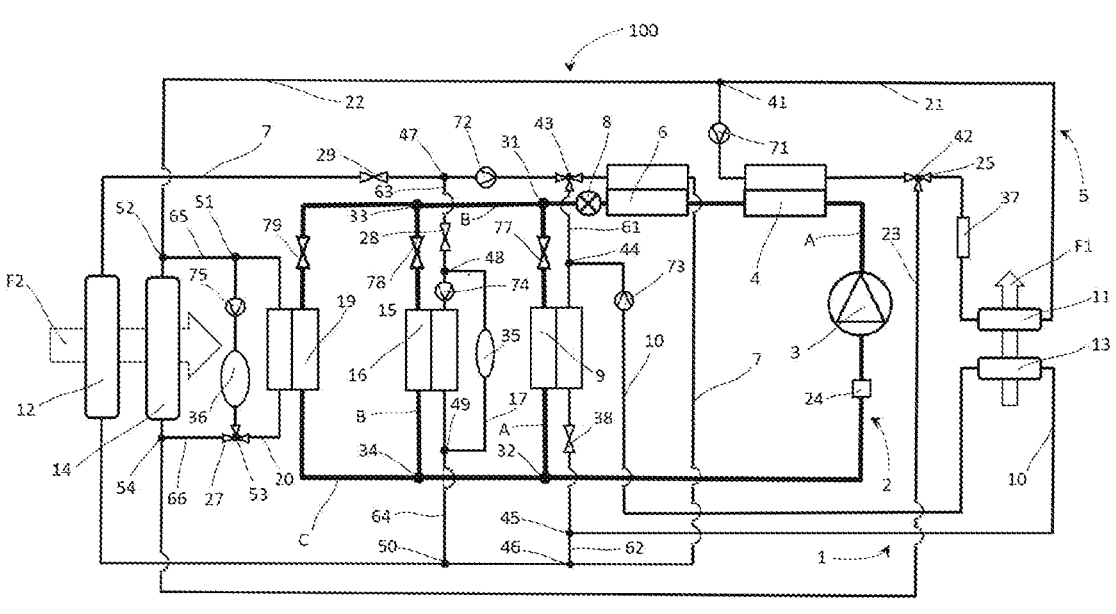
FIG. 3 is a schematic view of a thermal conditioning system according to a first variant of the second embodiment of the invention.
FIG. 4 is a schematic view of a thermal conditioning system according to a second variant of the second embodiment of the invention.

According to a first variant of the second embodiment illustrated on FIG. 3, the main loop A comprises an expansion device 8 arranged upstream of the first connection point 31, and a shut-off valve 77 arranged between the first connection point 31 and the third bifluid exchanger 9. The first bypass branch B comprises a shut-off valve 78 arranged upstream of the fourth bifluid exchanger 16. The second bypass branch C comprises a shut-off valve 79 arranged upstream of the fifth bifluid exchanger 19.

In other words, in this first variant, the thermal conditioning system 100 comprises a single expansion device 8 arranged on the circuit portion common to the main loop A and to both bypass branches B and C, and arranged downstream of the second bifluid exchanger 6. Shut-off valves 77, 78, 79 allow control of the distribution of the flow of refrigerant fluid between the main loop A and the bypass branches B and C.

According to the second embodiment, the fifth bifluid exchanger 19 is configured to be thermally coupled to a second element 36 of an electric drive train of the vehicle. The second element 36 of the electric drive train of the vehicle is configured to exchange heat with the heat-transfer liquid circulating in the fifth heat-transfer liquid loop 20. In the example illustrated, the second element 36 of the electric drive train of the vehicle is an electric propulsion motor of the vehicle. The second element 36 of the electric drive train of the vehicle can also be an electronic module for managing an electric propulsion motor of the vehicle.

According to an aspect of the invention, the first heat-transfer liquid loop 5 comprises:

a main loop 21 comprising the first bifluid exchanger 4 and the first heat exchanger 11, a bypass branch 23 connecting a first connection point 41 arranged upstream of the first bifluid exchanger 4 to a second connection point 42 arranged downstream of the first bifluid exchanger 4, the fourth heat exchanger 14 being arranged on the bypass branch 23.

In other words, the auxiliary loop 22 is formed by the bypass branch 23 and by a portion of the main loop 21. The portion of the main loop 21 between the first connection point 41 and the second connection point 42 is common to the main loop 21 and to the auxiliary loop 22. The circuit portion formed by the bypass branch 23 and by the portion of the main loop 21 between the first connection point 41 and the second connection point 42 thus forms the auxiliary loop 22.

The third heat-transfer liquid loop 10 and the second heat-transfer liquid loop 7 are configured to be fluidically connected.

For this, the heat-transfer liquid circuit 1 comprises a first connection branch 61 connecting a third connection point 43 arranged on the second heat-transfer liquid loop 7 between the second heat exchanger 12 and the second bifluid exchanger 6, to a fourth connection point 44 arranged on the third heat-transfer liquid loop 10 between the third heat exchanger 13 and the third bifluid exchanger 9. The third connection point 43 is arranged on the second heat-transfer liquid loop 7 downstream of the second heat exchanger 12 and upstream of the second bifluid exchanger 6. The fourth connection point 44 is arranged on the third loop 10 downstream of the third heat exchanger 13 and upstream of the third bifluid exchanger 9.

The heat-transfer liquid circuit 1 comprises a second connection branch 62 connecting a fifth connection point 45 arranged on the third heat-transfer liquid loop 10 between the third bifluid exchanger 9 and the third heat exchanger 13, to a sixth connection point 46 arranged on the second heat-transfer liquid loop 7 between the second bifluid exchanger 6 and the second heat exchanger 12. The fifth connection point 45 is arranged on the third heat-transfer liquid loop 10 downstream of the third bifluid exchanger 9 and upstream of the third heat exchanger 13. The sixth connection point 46 is arranged on the second heat-transfer liquid loop 7 downstream of the second bifluid exchanger 6 and upstream of the second heat exchanger 12.

The fourth heat-transfer liquid loop 17 and the second heat-transfer liquid loop 7 are configured to be fluidically connected.

For this, the heat-transfer liquid circuit 1 comprises a third connection branch 63 connecting a seventh connection point 47 arranged on the second heat-transfer liquid loop 7 between the second heat exchanger 12 and the third connection point 43, to an eighth connection point 48 arranged on the fourth heat-transfer liquid loop 17 between the fourth bifluid exchanger 16 and the first element 35. The seventh connection point 47 is arranged on the second heat-transfer liquid loop 7 downstream of the second heat exchanger 12 and upstream of the third connection point 43. The eighth connection point 48 is arranged on the fourth heat-transfer liquid loop 17 downstream of the fourth bifluid exchanger 16 and upstream of the first element 35.

The heat-transfer liquid circuit 1 thus comprises a fourth connection branch 64 connecting a ninth connection point 49 arranged on the fourth heat-transfer liquid loop 17 between the first element 35 of the drive train and the fourth bifluid exchanger 16, to a tenth connection point 50 arranged on the second heat-transfer liquid loop 7 between the sixth connection point 46 and the second heat exchanger 12. The ninth connection point 49 is arranged on the fourth heat-transfer liquid loop 17 downstream of the first element 35 and upstream of the fourth bifluid exchanger 16. The tenth connection point 50 is arranged on the second heat-transfer liquid loop 7 downstream of the sixth connection point 46 and upstream of the second heat exchanger 12.

The fifth heat-transfer liquid loop 20 and the first heat-transfer liquid loop 5 are configured to be fluidically connected.

More precisely, the fifth heat-transfer liquid loop 20 is configured to be connected to the auxiliary loop 22 of the first heat-transfer liquid loop 5.

For this, the heat-transfer liquid circuit 1 comprises a fifth connection branch 65 connecting an eleventh connection point 51 arranged on the fifth heat-transfer liquid loop 20 upstream of the second element 36 of the drive train and downstream of the fifth bifluid exchanger 19, to a twelfth connection point 52 arranged on the first heat-transfer liquid loop 5 between the first connection point 41 and the fourth heat exchanger 14. The twelfth connection point 52 is thus arranged on the bypass branch 23. The twelfth connection point 52 is downstream of the fourth heat exchanger 14.

The heat-transfer liquid circuit 1 also comprises a sixth connection branch 66 connecting a thirteenth connection point 53 arranged on the fifth heat-transfer liquid loop 20 upstream of the fifth bifluid exchanger 19 and downstream of the second element 36 of the drive train, to a fourteenth connection point 54 arranged on the first heat-transfer liquid loop 5 between the fourth heat exchanger 14 and the second connection point 42. The fourteenth connection point 54 is thus arranged on the bypass branch 23. The fourteenth connection point 54 is upstream of the fourth heat exchanger 14.

The first heat-transfer liquid loop 5 is configured to be separate from the second heat-transfer liquid loop 7. In other words, the first heat-transfer liquid loop 5 and the second heat-transfer liquid loop 7 are not connected. The heat-transfer liquid circulating in the first heat-transfer liquid loop 5 cannot mix with the heat-transfer liquid circulating in the second heat-transfer liquid loop 7. The two heat-transfer liquid circulation loops are thus independent. The second heat exchanger 12 and the fourth heat exchanger 14 cannot be connected by means of the heat-transfer liquid circuit. A fortiori, the first heat exchanger 11 and the third heat exchanger 13 cannot be connected by means of a portion of the heat-transfer liquid circuit 1.

The heat-transfer liquid circuit 1 comprises multiple circulation pumps. Thus the first heat-transfer liquid loop 5 comprises a first heat-transfer liquid circulation pump 71.

The first heat-transfer liquid circulation pump 71 is arranged in the portion common to the main loop 21 and to the auxiliary loop 22. The first pump 71 is arranged between the first connection point 41 and the second connection point 42. When the first pump 71 is in operation, the heat-transfer liquid circulates from the first connection point 41 to the second connection point 42.

The second heat-transfer liquid loop 7 comprises a second heat-transfer liquid circulation pump 72. The second heat-transfer liquid circulation pump 72 is arranged on the second heat-transfer liquid loop 7 between the seventh connection point 47 and the third connection point 43. When the second pump 72 is in operation, the heat-transfer liquid circulates from the seventh connection point 47 to the third connection point 43.

The third heat-transfer liquid loop 10 comprises a third heat-transfer liquid circulation pump 73. The third heat-transfer liquid circulation pump 73 is arranged on the third heat-transfer liquid loop 10 between the third heat exchanger 13 and the fourth connection point 44. When the third pump 73 is in operation, the heat-transfer liquid circulates from the third heat exchanger 13 to the fourth connection point 44.

The fourth heat-transfer liquid loop 17 comprises a fourth heat-transfer liquid circulation pump 74. The fourth heat-transfer liquid circulation pump 74 is arranged on the fourth heat-transfer liquid loop 17 between the eighth connection point 48 and the first element 35 of the drive train. The fourth heat-transfer liquid circulation pump 74 is configured to circulate the heat-transfer liquid from the eighth connection point 48 to the ninth connection point 49.

The fifth heat-transfer liquid loop 20 comprises a fifth heat-transfer liquid circulation pump 75. The fifth heat-transfer liquid circulation pump 75 is arranged on the fifth heat-transfer liquid loop 20 between the eleventh connection point 51 and the second element 36 of the drive train. The fifth heat-transfer liquid circulation pump 75 is configured to circulate the heat-transfer liquid from the eleventh connection point 51 to the thirteenth connection point 53.

On the embodiments illustrated, several three-way valves allow interconnection, i.e. fluidic communication, of various portions of the heat-transfer liquid circuit 1. The first heat-transfer liquid circulation loop 5 comprises a first three-way valve 25 arranged both on the main loop 21 and on the bypass branch 23.

As presented in FIG. 1, a first path 25a and a second path 25b of the first three-way valve 25 are arranged on the main loop 21. A third path 25c of the first three-way valve 25 is arranged on the bypass branch 23. The first three-way valve 25 allows interconnection of the main loop 21 of the first heat-transfer liquid circulation loop 5 and the auxiliary loop 22 of the first heat-transfer liquid circulation loop 5.

The second heat-transfer liquid circulation loop 7 comprises a second three-way valve 26 arranged on the first connection branch 61.

As indicated on FIG. 1, a first path 26a and a second path 26b of the second three-way valve 26 are arranged on the second heat-transfer liquid circulation loop 7. A third path 26c of the second three-way valve 26 is arranged on the first connection branch 61. The second three-way valve 26 thus allows interconnection of the second heat-transfer liquid circulation loop 7 and the third heat-transfer liquid circulation loop 10.

According to the second embodiment and as indicated in particular on FIG. 2, the fifth heat-transfer liquid circulation loop 20 comprises a third three-way valve 27 arranged both on the fifth circulation loop 20 and on the sixth connection branch 66.

A first path and a second path of the third three-way valve 27 are arranged on the fifth heat-transfer liquid circulation loop 20. A third path of the second three-way valve 27 is arranged on the sixth connection branch 66. The third three-way valve 27 allows interconnection of the fifth heat-transfer liquid circulation loop 20 and the first heat-transfer liquid circulation loop 5.

The heat-transfer liquid circuit 1 comprises multiple shut-off valves allowing control of the distribution of the flow of heat-transfer liquid between the different circuit portions. Thus the second heat-transfer liquid circulation loop 7 comprises a first shut-off valve 29. The first shut-off valve 29 is arranged between the second heat exchanger 12 and the seventh connection point 47. The third connection branch 63 comprises a second shut-off valve 28. Each shut-off valve allows selective authorization or prevention of circulation of the heat-transfer liquid in the portion on which the shut-off valve is arranged.

The main loop A of refrigerant fluid comprises a refrigerant fluid collection device 24 arranged downstream of the second connection point 32 and upstream of the compression device 2. Thus low-pressure refrigerant fluid passes through the collection device.

According to a second variant of the second embodiment illustrated on FIG. 4, the main loop A comprises an internal heat exchanger 56, the internal heat exchanger 56 comprising a first heat-exchange portion 57 arranged downstream of the second bifluid exchanger 6 and upstream of the first connection point 31, and a second heat-exchange portion 58 arranged downstream of the collection device 24 and upstream of the compression device 2, the internal heat exchanger 56 being configured to allow an exchange of heat between the refrigerant fluid in the first heat-exchange portion 57 and the refrigerant fluid in the second heat-exchange portion 58. In order to simplify FIG. 4, certain portions of the second loop 7 and third loop 10 have not been illustrated. Their definition remains identical to that shown on the other figures. The internal heat exchanger 56 thus allows an exchange of heat between the high-pressure refrigerant fluid leaving the second bifluid exchanger 6, and the low-pressure refrigerant fluid leaving the collection device 24.

According to a variant not shown, the thermal conditioning system comprises a device configured to vary a passage cross-section for the flow of the second air flow F2 to the second heat exchanger 14. This device allows variation of the flow of the second air flow F2 received by the second heat exchanger 14 and thus create an additional parameter allowing control of heat exchanges within the second exchanger 12 and the fourth exchanger 14.

FIG. 5 is a block diagram of an operating method of a thermal conditioning system according to the invention. FIGS. 6, 7, 8 and 9 schematically indicate operating modes of a thermal conditioning system according to the second embodiment. On these figures, the circuit portions in which refrigerant fluid or heat-transfer liquid circulates are depicted in solid lines. The portions in which refrigerant fluid does not circulate are depicted in dotted lines. Similarly, the portions in which the heat-transfer fluid does not circulate also depicted in dotted lines.

Figure 6:
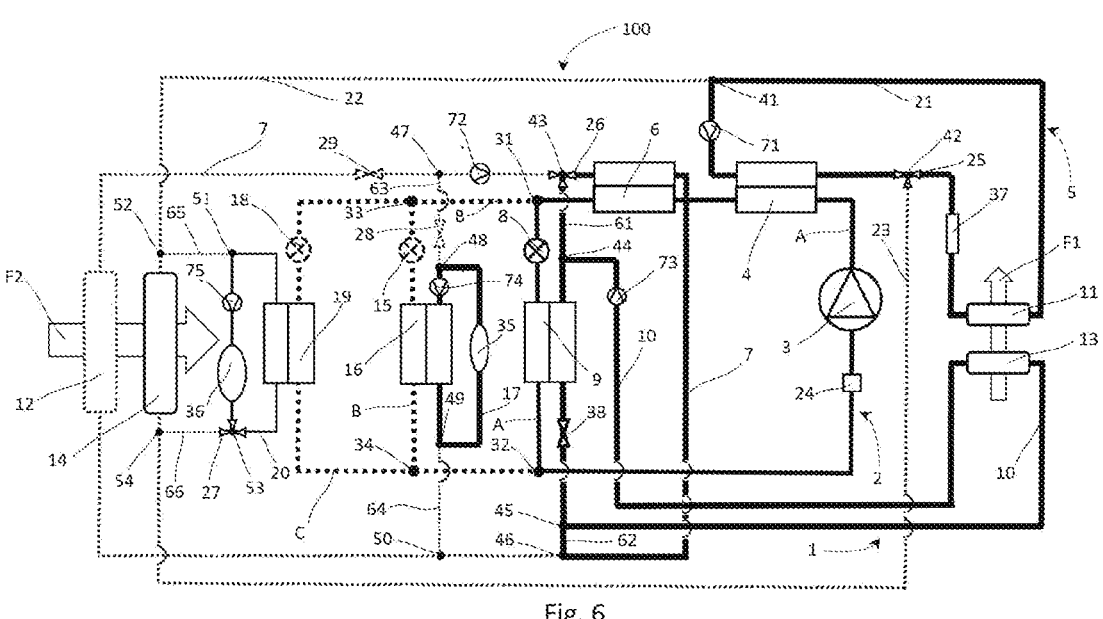
FIG. 6 is a schematic view of the thermal conditioning system according to the second variant of the second embodiment, functioning in a first operating mode called the decoupled heating mode.
Figure 7:
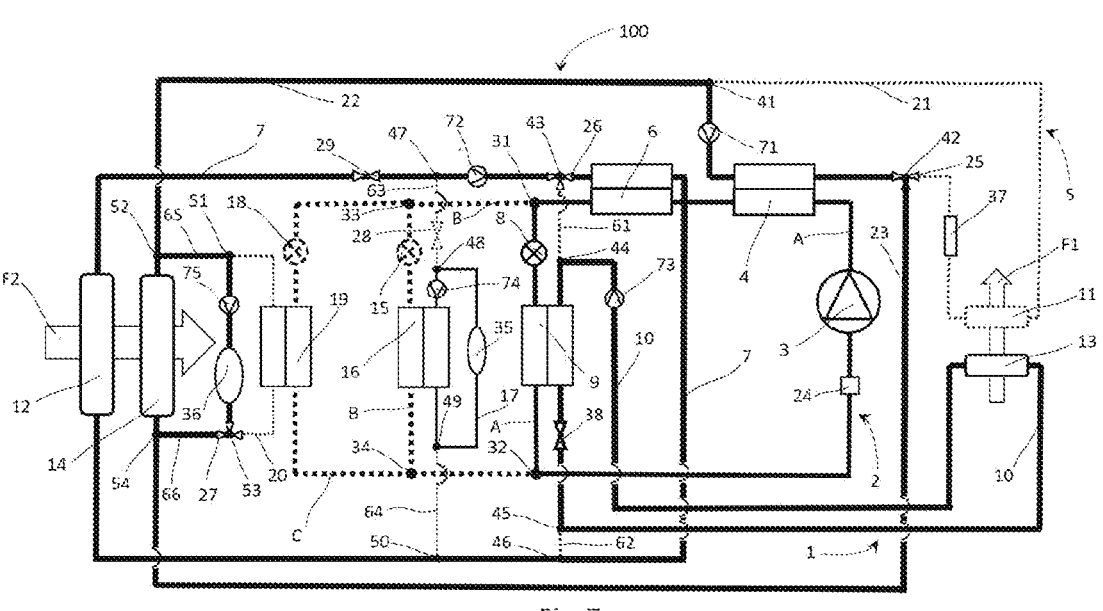
FIG. 7 is a schematic view of the thermal conditioning system according to the second variant of the second embodiment, functioning in a second operating mode called the decoupled cooling mode.

The invention also concerns a method for operating a thermal conditioning system as described above in a so-called decoupled heating mode. This operating method is illustrated in FIG. 6 and the method comprises the steps:

determination of a condensation temperature Ts of the refrigerant fluid leaving the compression device 3, (step 50)

heating of the heat-transfer fluid circulating in the first loop 5 of the heat-transfer fluid circuit 1 to a temperature above the determined condensation temperature Ts, (step 51)

circulation of the refrigerant fluid in the first bifluid exchanger 4 such that the refrigerant fluid is in a gaseous state at the outlet from the first bifluid exchanger 4, (step 52)

circulation of the refrigerant fluid in the second bifluid exchanger 6 such that the refrigerant fluid transfers heat to the heat-transfer liquid circulating in the second heat-transfer liquid loop 7, (step 53)

interconnection of the second heat-transfer liquid loop 7 and the third heat-transfer liquid loop 10, (step 54)

such that the third heat exchanger 13 transfers heat to the first air flow F1.

The first circulation loop of the heat-transfer liquid circuit 1 comprises an electrical heating device 37 configured for heating heat-transfer fluid. The method can comprise the step:

controlling the electrical heating device 37 so as to heat the heat-transfer fluid to a temperature above the determined condensation temperature Ts.

The electrical heating device 37 is arranged on the main loop 21 of the first heat-transfer liquid circulation loop 5.

In this operating mode, the first exchanger 11 and the third exchanger 13 both contribute heating the first air flow F1. The air flow F1 undergoes a first heating level on passing through the third exchanger 13, then undergoes a second heating level on passing through the first exchanger 11. The pressure of the refrigerant fluid in the refrigerant fluid circuit is independent of the temperature of the heat-transfer liquid in the first loop 5. In fact, the refrigerant fluid remains in the gaseous state at the outlet from the first bifluid exchanger 4, wherein its pressure is not equal to the saturation pressure corresponding to the temperature of the cooling liquid. The compression ratio to be ensured by the compression device 3 can remain low, which reduces the thermomechanical stresses. The reliability of the compression device 3 is improved.

The invention also relates to a method for operation of a thermal conditioning system as described above in a so-called decoupled cooling mode. The method, illustrated on FIG. 7, comprises the steps:

determination of a condensation temperature Ts of the refrigerant fluid leaving the compression device 3, (step 50)

circulation of the heat-transfer liquid in the fifth circulation loop 20 of the heat-transfer liquid circuit 1 such that the heat-transfer liquid absorbs heat from the second element 36 in the drive train, (step 55)

interconnection of the fifth loop 20 and the first loop 5 of the heat-transfer liquid circuit 1, (step 56)

circulation of the refrigerant fluid in the first bifluid exchanger 4, so as to heat the refrigerant fluid to a temperature above the determined condensation temperature Ts, such that the refrigerant fluid is in a gaseous state at the outlet from the first bifluid exchanger 4, circulation of the refrigerant fluid in the second bifluid exchanger 6, (step 57)

expansion of the refrigerant fluid in the first expansion device 8 so as to lower its pressure, circulation of the low-pressure refrigerant fluid in the third bifluid exchanger 9 so as to cool the heat-transfer liquid circulating in the third heat-transfer liquid circulation loop 10, circulation of the heat-transfer liquid in the third heat-transfer liquid circulation loop 10 such that the third heat exchanger 13 absorbs heat from the first air flow F1.

The fifth heat-transfer liquid circulation loop 20 and the first heat-transfer liquid circulation loop 5 are interconnected when the temperature of the heat-transfer liquid circulating in the fifth loop 20 is above a predefined threshold.

This case corresponds to an operation in which the second element 36 of the drive train dissipates a large amount of thermal power while the flow of the second air flow F2 is low. This case can occur for example when the vehicle is heavily loaded and climbing a steep gradient. Under these conditions, the heat-transfer liquid circulating in the fifth heat-transfer liquid loop 20 reaches a high temperature. This temperature can be higher than the condensation temperature of the high-pressure refrigerant fluid leaving the compression device 3. Consequently, the refrigerant fluid passing through the first bifluid exchanger 4 remains gaseous at the outlet from the first bifluid exchanger 4. The pressure in the refrigerant fluid circuit 2 therefore remains moderate since this pressure is different from the saturation pressure corresponding to the temperature of the heat-transfer liquid. The refrigerant fluid is at least partially condensed in the second bifluid exchanger 6 which is coupled to the second heat exchanger 12. The second heat exchanger 12 receives an air flow which is as cool as possible, since this air flow has not been heated by another heat exchanger. The second bifluid exchanger 6 is thus configured to allow condensation and/or sub-cooling of the high-pressure refrigerant fluid. The refrigerant fluid condensed in the second bifluid exchanger 6 is then expanded in the first expansion device 8 and evaporates in the third bifluid exchanger 9, enabling it to absorb heat from the heat-transfer liquid circulating in the third loop 10. The heat-transfer liquid thus cooled circulates in the third heat exchanger 13, which allows it to absorb heat from the first air flow F1 and thus cool it down. In the example illustrated, the passenger compartment of the vehicle is cooled. In this decoupled cooling mode, the second element of the drive train 36 and the first air flow F1 are both cooled. The thermal conditioning system 100 can function with a moderate refrigerant pressure and hence with a compression ratio of the compressor 3 which is itself moderate.

The invention also concerns a method for operation of a thermal conditioning system as described above in a so-called standard dehumidification and auxiliary heating mode, in which:

the refrigerant fluid circulates in the compression device 3 where its pressure rises, and circulates successively in the first bifluid exchanger 4, in the second bifluid exchanger 6 where it transfers heat to the heat-transfer liquid in the second loop 7, in the first expansion device 8 where its pressure falls, in the third bifluid exchanger 9 where it absorbs heat, the low-pressure refrigerant fluid returning to the compression device 3, the heat-transfer liquid of the second loop 7 circulates successively in the second bifluid exchanger 6 where it receives heat from the refrigerant fluid, in the fourth connection branch 64, in the first element 35 where it transfers heat to the first element 35.

Figure 8:
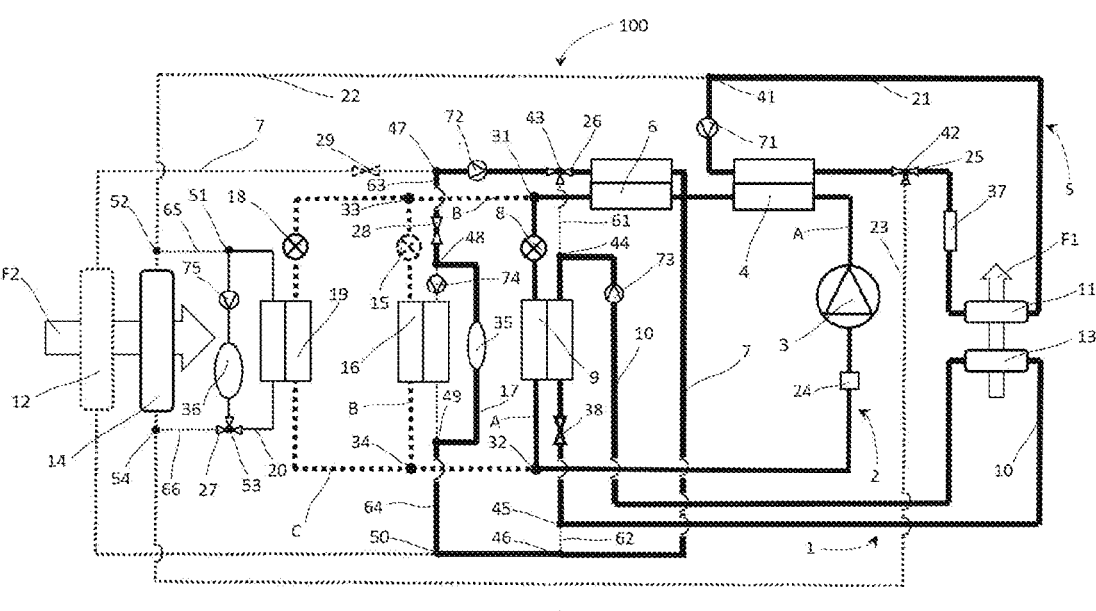
FIG. 8 is a schematic view of the thermal conditioning system according to the second variant of the second embodiment, functioning in a third operating mode called the standard dehumidification and auxiliary heating mode.

FIG. 8 illustrates this operating mode. The first air flow F1, which here corresponds to the air flow inside the passenger compartment of the vehicle, is cooled on passing through the third exchanger 13 and then reheated on passing through the first exchanger 11. The air flow F1 is thus dehumidified. At the same time, the first element 35 of the drive train, such as a battery, can be heated. The heated accessory here is then the first element 35. In this operating mode, the second circulation pump 72 is activated so that the heat-transfer liquid circulates in a part of the second loop 7, in the fourth connection branch 64, in the first element 35, and in the third connection branch 63. In this operating mode, the heat-transfer liquid circuit 1 comprises three independent loops: the above-described loop, the main loop 21 of the first loop 5, and the third loop 10. The first pump 71 and the third pump 73 are thus activated in order to circulate the heat-transfer liquid.

The invention also applies to a method for operation of a thermal conditioning system as described above in a so-called recuperation and auxiliary heating mode, in which:

the refrigerant fluid circulates in the compression device 3 where its pressure rises, and circulates successively in the first bifluid exchanger 4, in the second bifluid exchanger 6 where it transfers heat to the heat-transfer liquid in the second loop 7, in the third expansion device 18 where its pressure falls, in the fifth bifluid exchanger 19 where it absorbs heat, the low-pressure refrigerant fluid returning to the compression device 3, the heat-transfer liquid of the second loop 7 circulates successively in the second bifluid exchanger 6 where it receives heat from the refrigerant fluid, in the fourth connection branch 64, in the first element 35 where it transfers heat to the first element 35, the heat-transfer liquid of the fifth loop 20 circulates successively in the second element 36 where it absorbs heat, and in the fifth bifluid exchanger 19 where it transfers heat to the refrigerant fluid.

Figure 9:
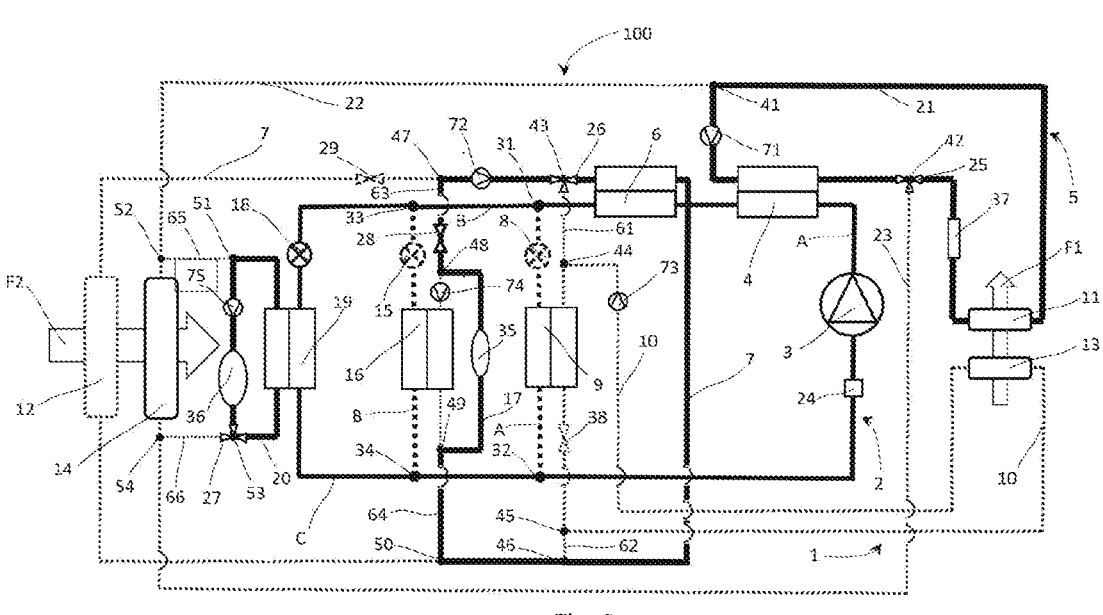
FIG. 9 is a schematic view of the thermal conditioning system according to the second variant of the second embodiment, functioning in a fourth operating mode called the recuperation and auxiliary heating mode.

FIG. 9 illustrates this operating mode. The high-pressure refrigerant fluid leaving the compression device 3 dissipates heat into the heat-transfer liquid at the second bifluid exchanger 6. The second pump 72 is activated to circulate the refrigerant fluid in the second bifluid exchanger 6, in the fourth connection branch 64, in the first element 35 and in the third connection branch 63. The heat-transfer liquid passes through the first element 35 allowing it to be heated. As before, the accessory heated is then here the first element 35. The refrigerant fluid extracts the heat provided by the second element 36 in the fifth bifluid exchanger 19. In other words, the heat recovered from the second element 36 allows heating of the first element 35. The fifth pump 75 is activated so as to circulate the heat-transfer liquid in the fifth loop 20. The fourth pump 74 is not activated, so the flow of heat-transfer liquid in the fourth bifluid exchanger 16 is zero.

In this operating mode, called recuperation and auxiliary heating mode, and in the mode known as standard dehumidification and auxiliary heating, the flow of heat-transfer fluid in the first loop 5 can be zero. Thus the quantity of heat transferred to the first element 35 is maximized. In fact, the heat exchange between the high-pressure refrigerant fluid leaving the compressor 3 and the heat-transfer liquid of the first loop 5 is minimized. For this, the first pump 71 remains stopped. As a variant, the flow of heat-transfer fluid can be held at a low value below 20% of the maximum flow of the first pump 71.

Alternatively or additionally, the flow of the first air flow F1 can be zero. For this, a flap (not shown) can block off the heat exchange surface of the first heat exchanger 11. The motorized fan assembly of the heating system can also remain stopped.

In the last two operating modes described, the entire flow of refrigerant fluid thus passes through either the third bifluid exchanger 9 or the fifth bifluid exchanger 19. It is also possible to divide the flow of refrigerant fluid between the two bifluid exchangers 9 and 19 by acting on the degree of opening of the first expansion device 8 and the third expansion device 18. An intermediate operating mode between the two modes is then achieved.

What is claimed is:

1. A thermal conditioning system comprising:
a heat transfer liquid circuit,
a refrigerant fluid circuit including a main refrigerant fluid circulation loop containing successively, in a circulation direction of the refrigerant fluid:
a compression device,
a first bifluid exchanger arranged both on the refrigerant fluid circuit and on a first loop of the heat-transfer liquid circuit so as to allow an exchange of heat between the refrigerant fluid and the heat-transfer liquid of the first loop,
a second bifluid exchanger arranged both on the refrigerant fluid circuit and on a second loop of the heat-transfer liquid circuit so as to allow an exchange of heat between the refrigerant fluid and the heat-transfer liquid of the second loop,
a first expansion device,
a third bifluid exchanger arranged both on the refrigerant fluid circuit and on a third loop of the heat-transfer liquid circuit so as to allow an exchange of heat between the refrigerant fluid and the heat-transfer liquid of the third loop,
wherein the first heat-transfer liquid loop includes a first heat exchanger configured to exchange heat with a first air flow,
wherein the second heat-transfer liquid loop includes a second heat exchanger configured to exchange heat with a second air flow,
wherein the third heat-transfer liquid loop includes a third heat exchanger configured to exchange heat with the first air flow, and wherein the first heat-transfer liquid loop includes a fourth heat exchanger configured to exchange heat with the second air flow, a main loop including the first bifluid exchanger and the first heat exchanger, a bypass branch connecting a first connection point arranged upstream of the first bifluid exchanger to a second connection point arranged downstream of the first bifluid exchanger, the fourth heat exchanger being arranged on the bypass branch, wherein the third heat-transfer liquid loop and the second heat-transfer liquid loop are configured to be fluidically connected, and wherein the heat-transfer liquid circuit includes a first connection branch connecting a third connection point arranged on the second heat-transfer liquid loop between the second heat exchanger and the second bifluid exchanger, to a fourth connection point arranged on the third heat-transfer liquid loop between the third heat exchanger and the third bifluid exchanger.

2. The thermal conditioning system as claimed in claim 1, wherein the second heat exchanger is arranged upstream of the fourth heat exchanger in a flow direction of the second air flow, and wherein the third heat exchanger is arranged upstream of the first heat exchanger in a flow direction of the first air flow.

3. The thermal conditioning system as claimed in claim 1, wherein the first air flow is an air flow inside a passenger compartment of a motor vehicle, and wherein the second air flow is an air flow outside a passenger compartment of a motor vehicle.

4. The thermal conditioning system as claimed in claim 1, wherein the first bypass branch connects a first connection point arranged on the main loop downstream of the second bifluid exchanger and upstream of the third bifluid exchanger, to a second connection point arranged on the main loop downstream of the third bifluid exchanger and upstream of the compression device, the first bypass branch including a fourth bifluid exchanger configured to exchange heat with a fourth heat-transfer liquid loop, and wherein the fourth bifluid exchanger is configured to be thermally coupled to a first element of an electric drive train of the vehicle.

5. The thermal conditioning system as claimed in claim 4, wherein the refrigerant fluid circuit includes a second bypass branch connecting a third connection point arranged on the first bypass branch upstream of the fourth bifluid exchanger, to a fourth connection point arranged on the first bypass branch downstream of the fourth bifluid exchanger and upstream of the second connection point, the second bypass branch including a fifth bifluid exchanger configured to exchange heat with a fifth heat-transfer liquid loop, and wherein the fifth bifluid exchanger is configured to be thermally coupled to a second element of an electric drive train of the vehicle.

6. The thermal conditioning system as claimed in claim 1, wherein the first heat-transfer liquid loop is configured to be separate from the second heat-transfer liquid loop.

7. The thermal conditioning system as claimed in claim 1, wherein the main loop includes an internal heat exchanger, the internal heat exchanger including a first heat-exchange portion arranged downstream of the second bifluid exchanger and upstream of a first connection point, and a second heat-exchange portion arranged downstream of a refrigerant fluid collection device and upstream of the compression device, the internal heat exchanger being configured to allow an exchange of heat between the refrigerant fluid in the first heat-exchange portion and the refrigerant fluid in the second heat-exchange portion.

8. The thermal conditioning system as claimed in claim 1, wherein the heat-transfer liquid circuit includes a second connection branch connecting a fifth connection point arranged on the third heat-transfer liquid loop between the third heat exchanger and the third bifluid exchanger, to a sixth connection point arranged on the second heat-transfer liquid loop between the second heat exchanger and the second bifluid exchanger, wherein the heat-transfer liquid circuit includes a third connection branch connecting a seventh connection point arranged on the second heat-transfer liquid loop between the second heat exchanger and the third connection point, to an eighth connection point arranged on the fourth heat-transfer liquid loop between a fourth bifluid exchanger and a first element, and wherein the second heat-transfer liquid loop includes a second heat-transfer liquid circulation pump arranged on the second heat-transfer liquid loop between the seventh connection point and the third connection point.

9. A method for operation of a thermal conditioning system in a decoupled cooling mode, the thermal conditioning system including:

a heat transfer liquid circuit, a refrigerant fluid circuit including a main refrigerant fluid circulation loop containing successively, in a circulation direction of the refrigerant fluid:

a compression device, a first bifluid exchanger arranged both on the refrigerant fluid circuit and on a first loop of the heat-transfer liquid circuit so as to allow an exchange of heat between the refrigerant fluid and the heat-transfer liquid of the first loop, a second bifluid exchanger arranged both on the refrigerant fluid circuit and on a second loop of the heat-transfer liquid circuit so as to allow an exchange of heat between the refrigerant fluid and the heat-transfer liquid circuit so as to allow an exchange of heat between the refrigerant fluid and the heat-transfer liquid of the third loop, wherein the first heat-transfer liquid loop includes a first heat exchanger configured to exchange heat with a first air flow, wherein the second heat-transfer liquid loop includes a second heat exchanger configured to exchange heat with a second air flow, wherein the third heat-transfer liquid loop includes a third heat exchanger configured to exchange heat with the first air flow, and wherein the first heat-transfer liquid loop includes a fourth heat exchanger configured to exchange heat with the second air flow;

wherein the method comprises:

determination of a condensation temperature of the refrigerant fluid leaving the compression device, circulation of the heat-transfer liquid in a fifth loop of the heat-transfer liquid circuit such that the heat-transfer liquid absorbs heat from the second element in the drive train, interconnection of the fifth loop and the first loop of the heat-transfer liquid circuit, circulation of the refrigerant fluid in the first bifluid exchanger, so as to heat the refrigerant fluid to a temperature above the determined condensation temperature, such that the refrigerant fluid is in a gaseous state at the outlet from the first bifluid exchanger, circulation of the refrigerant fluid in the second bifluid exchanger, expansion of the refrigerant fluid in the first expansion device so as to lower its pressure, circulation of the low-pressure refrigerant fluid in the third bifluid exchanger so as to cool the heat-transfer liquid circulating in the third heat-transfer liquid circulation loop, circulation of the heat-transfer liquid in the third heat-transfer liquid circulation loop such that the third heat exchanger absorbs heat from the first air flow.

10. A method for operation of a thermal conditioning system in a standard dehumidification and auxiliary heating mode, the thermal conditioning system including:

a heat transfer liquid circuit, a refrigerant fluid circuit including a main refrigerant fluid circulation loop containing successively, in a circulation direction of the refrigerant fluid:

a compression device, a first bifluid exchanger arranged both on the refrigerant fluid circuit and on a first loop of the heat-transfer liquid circuit so as to allow an exchange of heat between the refrigerant fluid and the heat-transfer liquid of the first loop, a second bifluid exchanger arranged both on the refrigerant fluid circuit and on a second loop of the heat-transfer liquid circuit so as to allow an exchange of heat between the refrigerant fluid and the heat-transfer liquid of the second loop, a first expansion device, a third bifluid exchanger arranged both on the refrigerant fluid circuit and on a third loop of the heat-transfer liquid circuit so as to allow an exchange of heat between the refrigerant fluid and the heat-transfer liquid of the third loop, wherein the first heat-transfer liquid loop includes a first heat exchanger configured to exchange heat with a first air flow, wherein the second heat-transfer liquid loop includes a second heat exchanger configured to exchange heat with a second air flow, wherein the third heat-transfer liquid loop includes a third heat exchanger configured to exchange heat with the first air flow, and wherein the first heat-transfer liquid loop includes a fourth heat exchanger configured to exchange heat with the second air flow;

wherein:

the refrigerant fluid circulates in the compression device where its pressure rises, and circulates successively in the first bifluid exchanger, in the second bifluid exchanger where it transfers heat to the heat-transfer liquid in the second loop, in the first expansion device where its pressure falls, in the third bifluid exchanger where it absorbs heat, the low-pressure refrigerant fluid returning to the compression device, the heat-transfer liquid of the second loop circulates successively in the second bifluid exchanger where it receives heat from the refrigerant fluid, in the fourth connection branch, in the first element where it transfers heat to the first element.

11. The method as claimed in claim 10, wherein the flow of heat-transfer liquid in the first loop is zero.

12. A method for operation of a thermal conditioning system in a recuperation and auxiliary heating mode, the thermal conditioning system including:

a heat transfer liquid circuit, a refrigerant fluid circuit including a main refrigerant fluid circulation loop containing successively, in a circulation direction of the refrigerant fluid:

a compression device, a first bifluid exchanger arranged both on the refrigerant fluid circuit and on a first loop of the heat transfer liquid circuit so as to allow an exchange of heat between the refrigerant fluid and the heat-transfer liquid of the first loop, a second bifluid exchanger arranged both on the refrigerant fluid circuit and on a second loop of the heat-transfer liquid circuit so as to allow an exchange of heat between the refrigerant fluid and the heat-transfer liquid of the second loop, a first expansion device, a third bifluid exchanger arranged both on the refrigerant fluid circuit and on a third loop of the heat-transfer liquid circuit so as to allow an exchange of heat between the refrigerant fluid and the heat-transfer liquid of the third loop, wherein the first heat-transfer liquid loop includes a first heat exchanger configured to exchange heat with a first air flow, wherein the second heat-transfer liquid loop includes a second heat exchanger configured to exchange heat with a second air flow, wherein the third heat-transfer liquid loop includes a third heat exchanger configured to exchange heat with the first air flow, and wherein the first heat-transfer liquid loop includes a fourth heat exchanger configured to exchange heat with the second air flow;

wherein:

the refrigerant fluid circulates in the compression device where its pressure rises, and circulates successively in the first bifluid exchanger, in the second bifluid exchanger where it transfers heat to the heat-transfer liquid in the second loop, in a third expansion device where its pressure falls, in the fifth bifluid exchanger where it absorbs heat, the low-pressure refrigerant fluid returning to the compression device, the heat-transfer liquid of the second loop circulates successively in the second bifluid exchanger where it receives heat from the refrigerant fluid, in the fourth connection branch, in the first element where it transfers heat to the first element, the heat-transfer liquid of a fifth loop circulates successively in the second element where it absorbs heat, and in the fifth bifluid exchanger where it transfers heat to the refrigerant fluid.

* * * * *